(No Model.)
P. D. WHITEHEAD.
FREIGHT CAR.
No. 424,915. Patented Apr. 1, 1890.
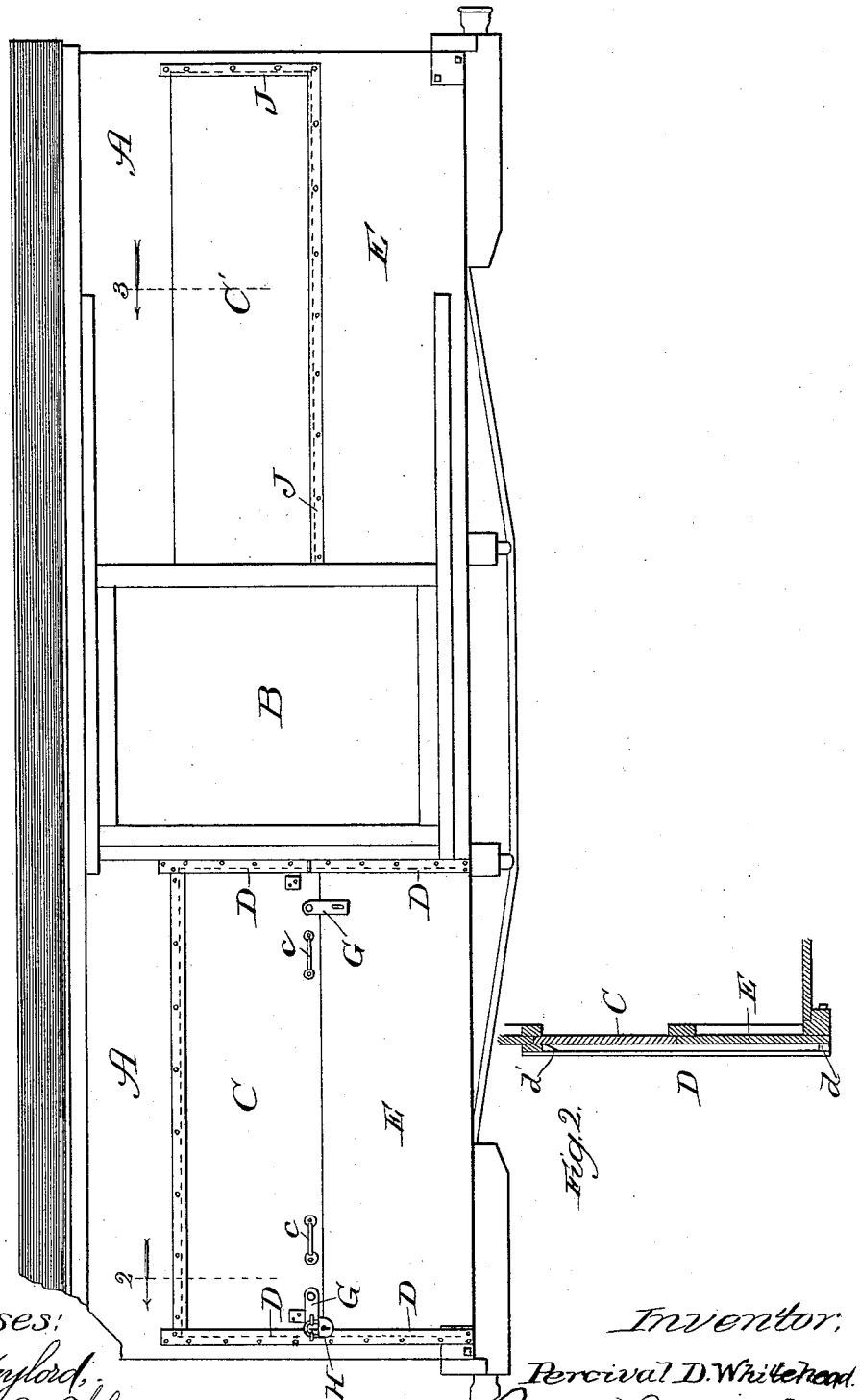

UNITED STATES PATENT OFFICE.

PERCIVAL D. WHITEHEAD, OF CHICAGO, ILLINOIS.

FREIGHT-CAR.

SPECIFICATION forming part of Letters Patent No. 424,915, dated April 1, 1890.

Application filed December 4, 1889. Serial No. 382,518. (No model.)

*To all whom it may concern:*

Be it known that I, PERCIVAL D. WHITEHEAD, a citizen of the United States, residing at Chicago, Cook county, Illinois, have invented a new and useful Improvement in Freight-Cars, of which the following is a specification.

The open or gondola cars now used for transporting coal are not adapted to carry many other things, and consequently have to be hauled back to the mines empty.

The object of my invention is to construct a box car in such a manner as to be convertible into an open car, or adapted to be used both as an open car to carry coal, &c., and a closed car to carry other things, so that coal may be brought from the mines and other articles brought back on the return trip; and the invention consists in the features and details of construction hereinafter described and claimed.

In the drawings, Figure 1 is a side elevation of a box car containing my improvement; and Fig. 2, a section on line 2 of Fig. 1, looking in the direction of the arrow.

A is the car-body; B, the ordinary sliding door; C C' C'', doors extending lengthwise of the car, and D guides in which the doors C slide.

The ends, floor, roof, and side doors of a box car equipped with my improvement are made in the ordinary manner and require no further description. I then construct the doors C C'. These doors, which are made on each side of the car, extend from either side of the door B to the ends of the car. They are located some distance above the floor of the car, as shown, and may be made in several ways.

The door C, Figs. 1 and 2, slides up and down in the guides D D. When closed, the lower edge of the door rests upon the upper edge of the side E of the car. When it is desired to open the door, its lower edge is pulled outward by the handles c c and the door allowed to slide down between the guides D D and rests upon the stops or blocks d d, its upper edge being flush with the side of the car E. To close the door it is slid up in the guides, and its upper edge, striking against the beveled blocks d' d', is guided into the groove F, after which its lower edge is pushed inward and rests on the side E, as above stated. It may be locked when closed by means of the blocks G and padlocks H, or in any other suitable manner. I have shown but two of these doors on each side of a car—one either side of the door B; but it is evident that more may be used, if desired. For instance, the space between the door B and the end of the car may be divided in two and two doors used, or three doors.

When the car is to be loaded with coal, the doors C C' are opened, thus forming a longitudinal opening along the side of the car and practically converting it into a gondola car; but when it is to be used to transport other things the doors C C' C'' should be closed, thus forming a box car.

The material of which the doors are made is not an essential matter, nor is the size thereof, so long as they afford an opening in the side of the car large enough to load through.

I claim—

1. A box car A, having a door B, and longitudinal doors C extending from the door B to the ends of the car and sliding up and down in guides D, whereby the doors C may be closed to form a box car or opened to form an open one, substantially as described.

2. The combination of the car A, door B, doors C, guides D, and blocks $d\ d'$, substantially as described.

PERCIVAL D. WHITEHEAD.

Witnesses:
 GEORGE S. PAYSON,
 SAMUEL E. HIBBEN.